US008612781B2

(12) United States Patent
Naffziger et al.

(10) Patent No.: US 8,612,781 B2
(45) Date of Patent: Dec. 17, 2013

(54) METHOD AND APPARATUS FOR APPLICATION OF POWER DENSITY MULTIPLIERS OPTIMALLY IN A MULTICORE SYSTEM

(75) Inventors: Samuel D. Naffziger, Fort Collins, CO (US); John P. Petry, San Diego, CA (US); Sridhar Sundaram, Sunset Valley, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 329 days.

(21) Appl. No.: 12/967,535

(22) Filed: Dec. 14, 2010

(65) Prior Publication Data

US 2012/0146708 A1 Jun. 14, 2012

(51) Int. Cl.
*G06F 1/32* (2006.01)

(52) U.S. Cl.
USPC ........... 713/300; 713/310; 713/320; 713/322; 713/323

(58) Field of Classification Search
USPC .......................... 713/300, 310, 320, 322, 323
See application file for complete search history.

(56) References Cited

U.S. PATENT DOCUMENTS

| | | | | |
|---|---|---|---|---|
| 7,653,824 | B2 * | 1/2010 | Rangarajan et al. | 713/300 |
| 2006/0053326 | A1 * | 3/2006 | Naveh et al. | 713/323 |
| 2006/0149975 | A1 * | 7/2006 | Rotem et al. | 713/300 |
| 2007/0033425 | A1 * | 2/2007 | Clark | 713/320 |
| 2008/0005592 | A1 * | 1/2008 | Allarey et al. | 713/300 |
| 2010/0169609 | A1 * | 7/2010 | Finkelstein et al. | 712/43 |
| 2011/0055596 | A1 * | 3/2011 | Wyatt | 713/300 |
| 2011/0113270 | A1 * | 5/2011 | Carter et al. | 713/320 |

OTHER PUBLICATIONS

"Advanced Configuration and Power Interface Specification," Hewlett-Corporation, Intel Corporation, Microsoft Corporation, Phoenix Technologies Ltd., Toshiba Corporation, Revision 4.0a, Apr. 5, 2010.

* cited by examiner

*Primary Examiner* — Kim Huynh
*Assistant Examiner* — Zahid Choudhury
(74) *Attorney, Agent, or Firm* — Volpe and Koenig, P.C.

(57) ABSTRACT

A method and an apparatus are described that delay application of a higher order Power Density Multiplier (PDM) using a time based moving average of a number of active cores in a multicore system. A PDM is applied to a thermal design power budget of a thermal entity and performance of the thermal entity is increased by transferring available power from a thermal entity not in an active state to a thermal entity in an active state. Sufficient time is allowed for the cooling effect of reduced active cores, to influence the active core that receives the extra power (a higher PDM). Similarly delaying application of a lower PDM with the same moving average, but a different threshold, allows a core to retain a higher power allocation until the more active neighbor core(s) cause it to heat up, thereby boosting core performance.

24 Claims, 5 Drawing Sheets

```
Always @ (posedge `Sample) {
// cpu remote cooling moving average
RemoteCoolingCounter = RemoteCoolingCounter + ActiveCoreCount – AvgCoolCores;
AvgCoolCores = RemoteCoolingCounter >> `CoolTcExp ;

// cpu local heating moving average
LocalHeatingCounter = LocalHeatingCounter + ActiveCoreCount – AvgHotCores;
AvgHotCores = LocalHeatingCounter>> `HotTcExp;

// Gpu remote cooling moving average
GpuPower = GpuPower + % power used – AvgGpuPower;
AvgGpuPower = GpuPower >> `GpuTcExp;
```

FIG. 3A

```
// determine whether to apply GPU PDM and value in GpuChipTdpDecr
If AvgGpuPower < `GpuActThr {
    Apply GPU PDM;  // use column B-PDM values in Table 3
    }
    Else {
    Do not apply GPU PDM;  // use left column PDM values in use column A-PDM values in Table 3
    }
```

FIG. 3B

```
// This simplification changes the time constant somewhat and determines an "average" that
asymptotically approaches the true moving average.

CoolPDM = if (AvgCoolCores<`1CoreActCoolThr) {PDM1} elseif (AvgCoolCores < `2CoreActCoolThr)
{PDM2} elseif (AvgCoolCores<`3CoreActCoolThr) {PDM3} else PDM4;

HotPDM = if (AvgHotCores>`3CoreActHotThr) {PDM4} elseif (AvgHotCores>`2CoreActHotThr)
{PDM3} elsif (AvgHotCores>`1CoreActHotThr) {PDM2} else PDM1;

PDM = min(CoolPDM,HotPDM)

METHOD AND APPARATUS FOR APPLICATION OF POWER DENSITY MULTIPLIERS OPTIMALLY IN A MULTICORE SYSTEM

FIELD OF INVENTION

This application is related to optimal operation of multicore processing units.

BACKGROUND

Power density per unit area of a semiconductor chip continues to increase exponentially with each new technology generation, posing a major challenge for thermal management in modern processors. In general, past work has examined architectural details for reducing total consumed chip power, but these techniques alone are insufficient.

Because power density has increased exponentially with Moore's Law, thermal cooling challenges have become a prominent and vexing aspect of computer systems design. Mechanical cooling solutions such as heat sinks and fans remain a possible approach for dealing with thermal issues. However, these solutions are costly and unwieldy.

"Thermal-aware" techniques at the architecture level have gained momentum for optimizing processor performance while also abiding by rapidly worsening thermal constraints. Thermal-aware architecture techniques are related to power-aware techniques, but are a distinct area because thermal-aware designs concern both local hotspot constraints as well as aggregate thermal limits.

The current industry trend has been toward multicore architectures, which provide additional opportunities for dynamic thermal management. Examples of this multicore architecture include devices that have multiple central processing units (CPUs); multiple graphics processing unit (GPUs), multiple digital signal processors (DSPs), multiple field programmable gate arrays (FPGAs), an application processor (Apps processor), or various combinations thereof. Thermal simulations on these hybrid devices show that lateral thermal influence is at least two orders of magnitude slower than self-heating events.

A processor core is an example of a thermal entity, but other examples of thermal entities include other logic blocks, such as video encoders/decoders, memory controllers, I/O blocks, schedulers etc.

In general, processors are designed while keeping thermal constraints in mind. It is common in the industry to assume an equal power distribution among all thermal entities. But this assumption leads to a result that is generally inefficient, because one thermal entity may be in an active state while others may be inactive. It is not possible to immediately allocate power from an inactive thermal entity and distribute it to an active thermal entity and still remain within the thermal constraints.

Hence what is required is a method and apparatus to efficiently allocate power from an inactive thermal entity to an active thermal entity while keeping thermal constraints in mind.

SUMMARY OF EMBODIMENTS

Embodiments described herein include delaying the application of higher order power density multipliers (PDMs) in determining the power allocation of a thermal entity using a time-based moving average of the number of thermal entities. Sufficient time may be allowed for the cooling effect of thermal entities reduced in power consumption to influence the active thermal entities that are allotted the available power using a PDM. Similarly delaying the application of a lower PDM with the same moving average, but a different threshold, allows a thermal entity to retain a higher power allocation for a period of time until the more active neighbor thermal entities cause it to heat up. Performance of a thermal entity is boosted by application of PDM to a thermal design power (TDP) of each thermal entity budget for transferring available power from the thermal entities not in an active state to the thermal entities in an active state.

BRIEF DESCRIPTION OF THE DRAWINGS

A more detailed understanding may be had from the following description, given by way of example in conjunction with the accompanying drawings wherein:

FIGS. 3A-3C show implementations of PDMs in the multicore processing system of FIG. 1;

DETAILED DESCRIPTION OF EMBODIMENTS

Figure 1:
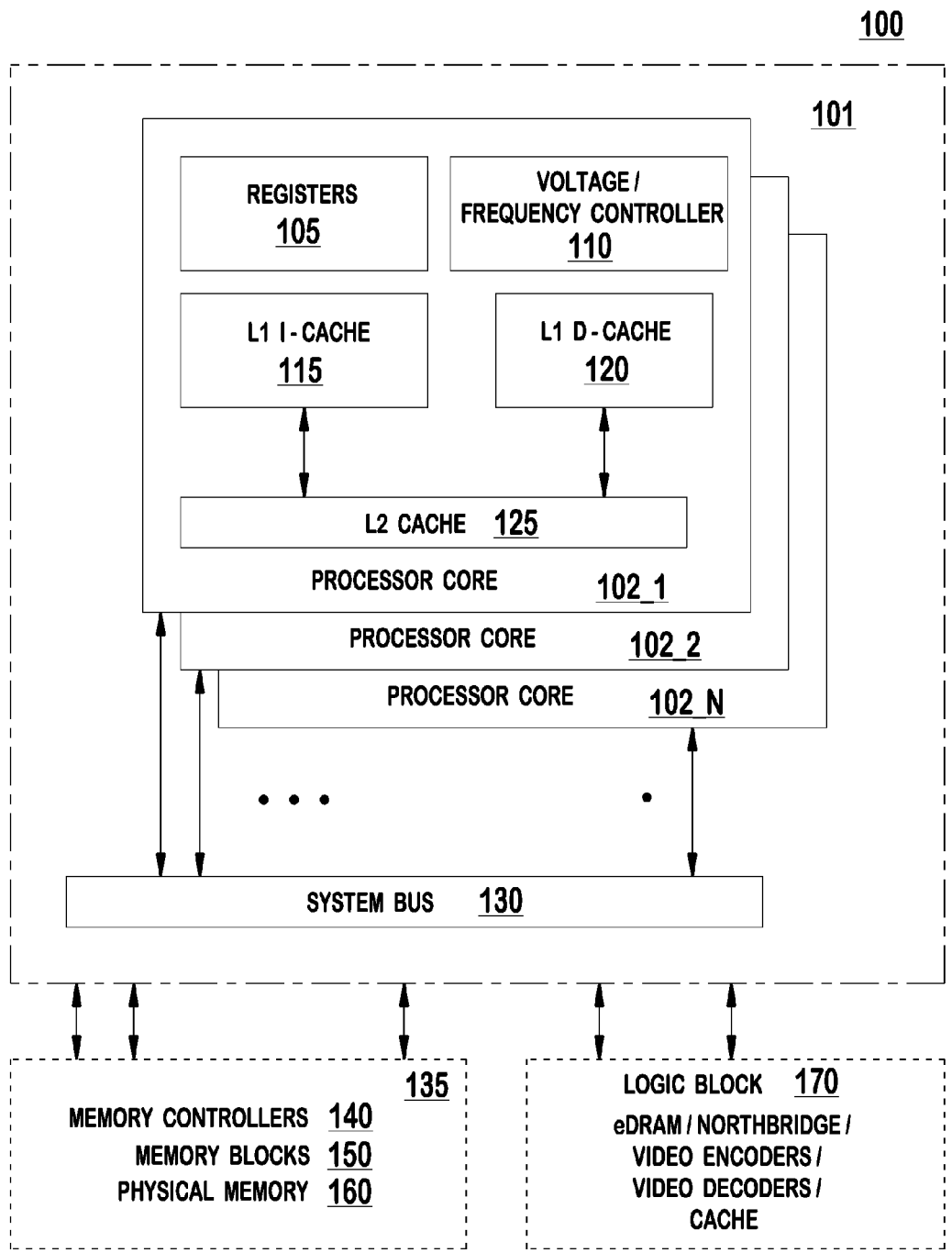
FIG. 1 is a block diagram of a multicore processing system in accordance with various embodiments disclosed.

FIG. 1 describes a block diagram of a data processing system 100 that uses a multicore processor 101 in accordance with embodiments of the present invention. The multicore processor 101 may include a plurality of processor cores 102_1, . . . , 102_N electrically coupled to each other by a System Bus 130. In FIG. 1, each processor core 102 may be an integrated circuit comprising Registers 105, a voltage/frequency controller 110, an associated level one (L1) instruction cache 115, an associated Level-1 data cache 120, and an on-chip level two (L2) cache 125. The L1 and L2 caches are collectively known as a cache subsystem. In FIG. 1, the memory sub-system 135 of the data processing system 100 includes a physical memory 160, one or more memory blocks 150, and a memory controller 140. The memory sub-system may include either dynamic random access memory (DRAM) devices or static random access memory (SRAM) devices. Each processor core 102 may be a central processing unit (CPU), a graphics processing unit (GPU), a field programmable gate array (FPGA), a digital signal processor (DSP), an application processor (Apps processor), or a similar device.

The voltage/frequency controller 110 within each processor core 102 may be used to trigger a voltage/frequency adjustment if required. Each processor core 102 may control its own voltage and frequency operating points through the frequency/voltage controller 110. In one embodiment, the voltage/frequency controller 110 measures the electrical current consumption of the processor core 102 or the temperature of the multicore processor 101.

In an alternate embodiment, the voltage/frequency controller 110 may also receive inputs from sensors external to the multicore processor 101. Alternate embodiments of a voltage/frequency controller 110 mechanism may also be used in microcontrollers, embedded processors, graphics devices, digital signal processors (DSPs) or other types of logic circuits.

Each processor core 102 may also be electrically coupled to separate logic blocks, shown as a single logic block 170 in FIG. 1. These separate logic blocks 170 include, for example, embedded dynamic random access memory (eDRAM), video encoders/decoders, northbridge functionality blocks, schedulers, applications, caches, etc. The logic blocks 170 consume power, have various sleep states, and may act as heat sinks for other blocks of the data processing system 100 depending on their activity levels.

It is noted that in some embodiments, the data processing system 100 includes fewer or additional components. Moreover, two or more components may be combined into a single component and/or a position of one or more components may be changed.

Each processor core 102 may be initiated into various power states, such as C0, C1, ... C6, and various other performance states, such as P0 ... Pn, described in the Advanced Configuration and Power Interface (ACPI) Specification, Revision 4.0a, Apr. 5, 2010, for example. A state of C0/P0 ... Pn implies an active state in the performance range of P0 to Pn. A power state of C6 implies that the entire multicore processor system may be power gated, while CC6 implies a specific core within the multicore processor system is in an inactive, power gated state which is also referred to as the gated state in FIG. 2.

These power management states enable the data processing system 100 of FIG. 1 to achieve a balance between performance, power consumption and battery life, thermal requirements, and noise-level requirements. During idle periods, any of the processor cores 102 may be selectively switched off to enter into a low power state, thereby reducing the overall power consumed by the multicore processor 101. Before temporarily switching off a processor core, its microarchitecture state is first saved internally and the saved state is restored when the processor core is subsequently reawakened (i.e., switched on). For example, the C4 state effectively switches off the core clock and phase-locked loop (PLL) of the processor core while the L1 caches 115, 120 are flushed and the L2 cache 125 is partially flushed. In contrast, in the CC6 state, both the core clock and PLL of a specific processor core are switched off while the L1 and L2 caches 115, 120, 125 are flushed and the power to the specific processor core is switched off. In particular, a processor core may consume as little as 100 milliWatts (mW) of power in the CC6 state.

The ACPI also manages the CPU core frequencies in the form of P-state requests. Each above-referenced ACPI specification P-state setting is a request made by the operating system to the CPU. P-states are calculated by the operating system based on the computation required to be performed by the processor core. In high P-states, the operating system requires a higher performance level. In these high P-states, the processor core can provide a higher operating frequency than requested by the operating system to provide a higher performance level. If the processor core is operating in the high performance modes while optimizing performance, the operating frequency may be higher than the frequency value predetermined by the corresponding voltage-frequency curve.

Power Management techniques allow various applications to run at their peak performance while managing them to a pre-determined thermal power limit (set by packaging, power supplies, etc). This allows the peak voltage and frequency to be exceeded beyond what is typically visible to the operating system as a P0 state. This is called "boosting." Essentially, all possible applications are boosted for as much time as possible while being constrained to thermal design limits and cut power through P-state limiting when the power exceeds design limits. The core digital power monitor unit (DPM) works with the chip-level APM by providing it with a digital measure of the energy consumed inside the core. This information is presented in the form of two 8-bit values through a standard interface and directly corresponds to: (1) the total energy spent in the core since it was sampled last and (2) the average amount of AC switching capacitance switched per cycle, respectively.

Using power management algorithms involves using power density multipliers (PDMs) to boost performance of active thermal entities (e.g., processor cores such as CPUs, GPUs, FPGAs, DSPs, or similar devices; or other logic blocks) which are already operating at the highest possible operating system requested performance level. PDMs rely on the concept that when one or more cores are inactive in the CC6 state, lateral cooling from these inactive cores is used to boost performance of active cores.

However, an instantaneous application of a higher PDM as soon as a thermal entity becomes inactive results in significant thermal excursions above the device's temperature limit, because the cooling effect of the inactive cores is slower than the self-heating effect of the active core making use of the higher PDM.

Thermal analyses show that de-rating the PDMs to half of their static value and immediate application to a thermal entity still results in excursions over 100° C., the temperature limit for many processors. Thermal analyses also show that PDMs would have to be de-rated to below half of their static value to allow for immediate application of the PDMs. This requirement may reduce the performance improvements that are possible with the application of PDMs. Hence proper application of APM techniques requires analysis of each thermal entity within a semiconductor device.

Various embodiments are disclosed for the application of APM techniques including the use of PDMs. To apply PDMs, thermal analysis is applied on a per-core basis. In the embodiments disclosed, examples of a thermal entity are a CPU and a GPU. However, it would be clear to one skilled in the art that the teachings herein may also be applied to other thermal entities including other types of processor cores and logic blocks.

Figure 2:
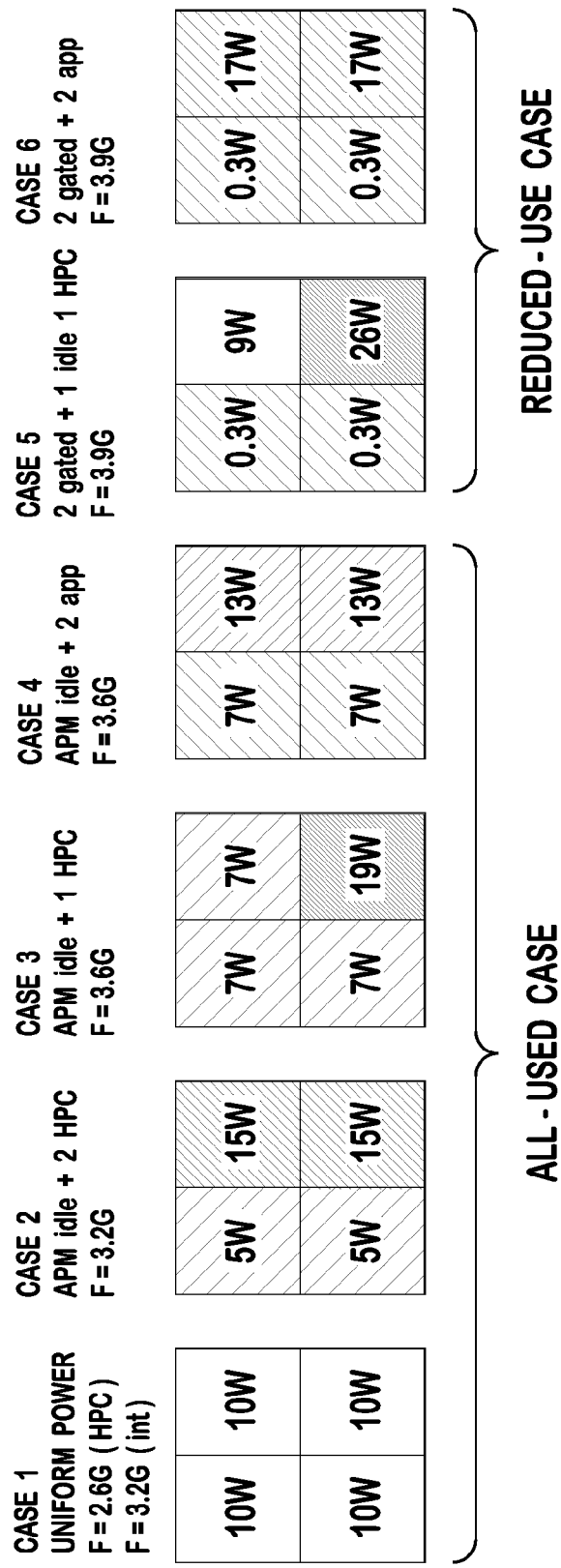
FIG. 2 shows a scenario involving use of an all-core operating case, and a reduced-core operating case using PDM in the multicore processing system of FIG. 1.

FIG. 2 shows six separate cases of applying PDM to four thermal entities. In case 1, all four thermal entities have a uniform power allocation. This is a typical case in the prior art where it was assumed that each thermal entity operates independently, and it is not possible to allocate the idle power of one entity to another entity and thus no PDM may be applied. In FIG. 2, each thermal entity has a 10 Watt thermal design power (TDP) budget, and the TDP defines the baseline limit of power dissipation. Without use of proper APM techniques, core power needs are constrained at 10 W per thermal entity, to avoid overheating. As a result, designers lose the ability to maximize single thread performance due to the power limitation.

The fact that there may be lower thermal activity in one thermal entity enables that thermal entity to act as a heat sink for another thermal entity. But in case 1, the heat transfer process is inefficient and depends upon device geometry and other cooling factors. These include the relative placement of a thermal entity with respect to other thermal entities.

Because utilization of a thermal entity depends on the power state (C0 or CC6) and the application running on it, not all cores may consume the thermal entity budgeted TDP. An application may be a high performance computing (HPC)

application that results in a higher load on the thermal entity, thereby consuming more than the per thermal entity TDP budget. Alternately, the application may be a regular integer processing type application that consumes less than the thermal design budget of the thermal entity. A resulting scenario may be where different thermal entities are utilized differently, for example, as shown in case 5 or in case 6 in FIG. 2. In cases 5 and 6, the two left most thermal entities are in an inactive CC6 state and are therefore power gated. Case 5 and case 6 are the candidate cases for applying PDMs because the power gated (CC6 state) thermal entities may act as thermal heat sinks with the appropriate lateral cooling time constant. Similarly, in case 2, there are two high performing thermal entities and two thermal entities are consuming less than the allotted share of power. In case 3, there is a single high performing thermal entity, and three thermal entities consume less than their allotted share of power. In case 4, two entities run two applications and the other two entities consume less than their allotted share. One skilled in the art would understand that the different cases provided in FIG. 2 are provided by way of example only and a number of other different cases are possible.

Referring again to case 5, the amount of power that is consumed is dependent upon the combination of power and performance state of the thermal entities. In case 5, the rightmost thermal entities are in the active state and the leftmost thermal entities are in the CC6 state. The power consumed, in turn, is dependent upon the amount of power that an application consumes in an active core. For example, an application may be an HPC type or integer code type as described earlier. Performance states for each thermal entity are discrete, and translate into frequency and voltage, but there is a difference between actual application and how much power is consumed. In case 5, power states and the applications on the active cores are not homogenous and one active thermal entity consumes 26 W, whereas another active thermal entity consumes 9 W, and the inactive thermal entities in the CC6 state each consume 0.3 W.

Similarly for case 6, two active thermal entities each consume 17 W and the other two inactive thermal entities, in the CC6 state each consume 0.3 W.

For proper application of PDMs, the number of thermal entities or inactive cores in CC6 states in the data processing system 100 of FIG. 1 is determined, and then a PDM factor is applied to the allotted power of the active thermal entities to allow them to achieve a higher performance level. Essentially, a moving average method is used to determine the average number of cool thermal entities or hot thermal entities in the system of FIG. 1.

In one embodiment involving central processing units (CPUs), to determine a PDM for a given number of CPUs, counters are used to compute moving averages. For example, a LocalHeatingCounter is used to track local heating based on local heating time constants, while a RemoteCoolingCounter is used to track remote cooling based on remote cooling time constants.

The counters may be, for example, 24 bits; a format including a 20 bit integer and a four bit fraction. Time constants are selected so that the division in computing the values of average cool cores (AvgCoolCores) and average hot cores (AugHotCores) may be accomplished by shifting right and approach as near as possible to a value of 12.5 seconds (s) for the remote cooling counter time constant and 100 milliseconds (ms) for the local heating counter time constant.

One skilled in the art would recognize that a counter based scheme may also be used to apply PDM for other types of thermal entities where the thermal entities involved are of the same type. This may involve applying a higher order PDM in determining the power allocation of a thermal entity using a time-based moving average of the number of thermal entities. Sufficient time may be allowed for the cooling effect of thermal entities reduced in power consumption to influence the active thermal entities that are allotted the available power using a PDM.

In another embodiment involving graphics processing units (GPUs), a counter is used to compute the moving average of the activity level in a GPU. The activity level may either be generated by using power gating as a binary proxy for the activity level or by using the GPU Dynamic Power Management state translated to a percentage of maximum power. In this embodiment, the counter may be, for example, 24 bits; a format including a 16 bit integer and an eight bit fraction. The time constant is selected so that the division in computing an average GPU power (AvgGpuPower) may be accomplished by shifting right and initially be as close as possible to a value specific to device geometry, for example a value of 12.5 s. The value 12.5 s is for the specific device geometry for the discussed embodiment, but it is understood by those skilled in the art that timing values may change according to the device type, but the teachings of the embodiments described herein would still be applicable.

To boost overall performance of the multicore processor 101, PDM is applied as follows. In the case where the thermal entity is a GPU, and if the average GPU power (AvgGpuPower) is less than the actual GPU threshold (GpuActThr) (i.e. AvgGpuPower<GpuActThr), then the GPU PDM may be applied. However, if the average GPU power is greater than the GPU actual thoroughput/threshold (i.e., AvgGpuPower>GpuActThr), then the GPU PDM is not applied. The voltage/frequency controller 110 within each processor core 102 is used to trigger a voltage/frequency adjustment according to the PDM.

Applying the GPU PDM affects the entities TDP limit. These parameters may either be stored in the registers 105 directly or may be computed by the voltage/frequency controller 110.

Similarly, one skilled in the art would recognize that a threshold based scheme may also be used to apply PDM for other types of thermal entities where the thermal entities involved are not of the same type. This may involve applying a lower PDM with the same moving average, but a different threshold, allowing a thermal entity to retain a higher power allocation until the more active neighboring thermal entities cause it to heat up.

With respect to the embodiments discussed above, the parameters and algorithm used to determine and apply PDMs are now described in greater detail. Table 1 shows a list of parameters used to implement the moving average solution. A product may be a combination of different thermal entities-for example a combination of CPUs, GPUs, FPGAs, DSPs, and other logic blocks, such as, video encoders/decoders, memory controllers, schedulers, I/O blocks, etc. according to the combinations as described above. In Table 1, even though values of parameters are provided according to a specific device, those skilled in the art would realize that the parameter values are dependent upon device type and accordingly would make changes to the parameter values depending upon device type.

In Table 1, 'Sample is a parameter having a value of 200 µsec and describes the time period after which the GPU power level and core power states are checked. '1CoreActCoolThr [7:0] describes a threshold for a single core active cooling parameter. Similarly '1CoreActHotThr[7:0] describes a threshold for one core active cooling parameter and so forth.

Relevant information of the parameters listed in Table 1 is described therein.

TABLE 1

Parameter values for implementing moving average functionality.

| Function/Parameter | Initial value | Description |
|---|---|---|
| ˋSample | 200 μsec | Rate at which GPU power level and Cores in CC6 is checked |
| ˋHeatTcExp[7:0] | 9 (dec) Implies time constant = 512 * 200 μsec or ~102 ms | Local heating moving average time constant exponent(must be binary multiple of ˋSample in order to implement shift right moving average) Time constant = ˋSample * 2^ˋHeatTcExp |
| ˋCoolTcExp[7:0] | 16 (dec) Implies time constant = 65536 * 200 μsec or 13.1 secs. | Remote cooling moving average time constant exponent(must be binary multiple of ˋSample in order to implement shift right moving average) Time constant = ˋSample * 2^ˋCoolTcExp |
| ˋGpuTcExp[7:0] | 16(dec) Implies time constant = 65536 * 200 μsec or 13.1 secs. | GPU activity level time constant exponent. Time constant = ˋSample * 2^ˋGpuTcExp |
| ˋ1CoreActCoolThr[7:0] | 0001.0010 (binary) ~1.1 dec | Threshold for 1 core active Cooling. Format is Int[7:4].Frac[3:0] |
| ˋ2CoreActCoolThr[7:0] | 0010.0010 (binary) ~2.1 dec | Threshold for 2 core active Cooling. Format is Int[7:4].Frac[3:0] |
| ˋ3CoreActCoolThr[7:0] | 0011.0010 (binary) ~3.1 dec | Threshold for 3 core active Cooling Format is Int[7:4].Frac[3:0] |
| ˋ3CoreActHotThr[7:0] | 0011.0010 (binary) ~3.1 dec | Threshold for 3 core active Heating Format is Int[7:4].Frac[3:0] |
| ˋ2CoreActHotThr[7:0] | 0010.0010 (binary) ~2.1 dec | Threshold for 2 core active Heating Format is Int[7:4].Frac[3:0] |
| ˋ1CoreActHotThr[7:0] | 0001.0010 (binary) ~1.1 dec | Threshold for 1 core active Heating Format is Int[7:4].Frac[3:0] |
| ˋGpuActThr[7:0] | 0.00011010 (binary) ~10% | Threshold to apply GPU active PDM and chip level credit based on value in ˋGpuActThr Format is 0.Frac[7:0] |

Table 2 describes the power benefit that may be allocated from an inactive core to an active core depending on the rating of a multicore processor part, such as one shown in FIG. 1, assuming that PDMs are applied, keeping in mind the thermal constraints imposed. Each row in Table 2 describes the values for a specific part having a power rating. For example, a part number (OPN) having a power rating of 35 W and having a single active core, may be pushed from 5.57 W up to 14.6 W. Similarly, for a part that has a rating of 100 W, a single active core may be pushed from 20.62 W up by 54.04 W.

TABLE 2

Sample GPU Chip Total Dynamic power decrement values

| OPN | TDP budget 4cores/1core | TDP 1 core × max PDM (2.62) [from Table 3] | GpuTDP | Rest of Chip TDP budget |
|---|---|---|---|---|
| 35 W | 22.3 W/5.57 W | 14.6 W | 5.3 W | 7.4 W |
| 45 W | 31.1 W/7.75 W | 20.37 W | 6.1 W | 7.8 W |
| 75 W | 57.5 W/14.37 W | 37.67 W | 7.9 W | 9.6 W |
| 100 W | 82.5 W/20.62 W | 54.04 W | 7.9 W | 9.6 W |

While determining the parameters in Table 2, a multicore system is categorized according to power rating of each thermal entity. Hence, it would be apparent to those skilled in the art from the teachings of the various embodiments described herein to apply PDM according to the power rating of each thermal entity in the system because other thermal entities have power ratings which further depend on device geometry, functions, applications, etc. These thermal entities may consume varying amounts of power, have various sleep states, and therefore may act as heat sinks for other portions of a die of a system.

In Table 2, values are provided for in terms of power rating for a processor core and a GPU, and therefore parameters similar to those of Table 2 may also be used for application of PDM to other thermal entities.

Similarly, Table 3 describes example values of power density multipliers (PDMs) when a processor core, for example a GPU, is in an active or an idle state. The PDM values are derived from a static thermal test bench for a product type. Various combinations of thermal entities are used—combining one CPU and one GPU, or different combinations of CPUs and GPUs to derive the results of Table 3. It would be understood by those skilled in the art that other combinations of processor cores including for example, CPUs, GPUs, DSPs, and FPGAs, would also be possible. Table 3 indicates scenarios for a four core case where GPU values are greater than or less than its threshold.

In Table 3 for row 1, where a single core is active and three cores are inactive (in the CC6 state), and where GPU activity is greater than the GPU Activity threshold, a GPU may not be able to push power to CPU cores and hence the PDM is 1.99. As described above, the value of 1.99 was derived from a thermal test bench which comprehends only static thermal behavior for a product type. However, when the GPU activity is less than the activity threshold, the PDM used is 2.62. Similarly for PDM4, where four cores are active, and the GPU activity is greater than the threshold, the GPU cannot contribute any power to the CPUs, and the multiple is one—no PDM is applied. However, when the GPU activity is less than the threshold, the PDM may be 1.32.

TABLE 3

Sample PDMs with GPU active/idle

| Description | A GPU activity > ˋGpuActThr | B GPU activity < ˋGpuActThr |
|---|---|---|
| PDM1 (1 core active) | 1.99 | 2.62 (=1.32 * prior column) |
| PDM2 (2 cores active) | 1.49 | 1.97 (=1.32 * prior column) |
| PDM3 (3 cores active) | 1.17 | 1.53 (=1.32 * prior column) |
| PDM4 (4 cores active) | 1.00 | 1.32 (=1.32 * prior column) |

FIGS. 3A-3C show example algorithms for implementing the use of PDMs under the aforementioned conditions. The conditions include variations in the number of active thermal entities or cores. The example algorithms are pseudo codes for determining a CPU remote cooling moving average, a CPU local heating moving average, a GPU remote cooling moving average, an application of GPU PDM, and a moving average for determining application of PDM. Other combinations of thermal entities for CPUs, GPUs, DSPs, FPGAs, apps processors, and other similar thermal entities may also be derived according to the description provided herein. Additionally, FIGS. 3A-3C describe the implementation of PDMs by CPUs and GPUs. However, the teachings as described herein may also apply to other thermal entities such as DSP, FPGAs, and logic blocks including encoders/decoders, memory controllers, and the like.

As an example, in one pseudo code in FIG. 3A, a CPU remote cooling moving average is derived. A remote cooling parameter is first determined according to a previous value of the remote cooling parameter and an active core count reduced by average cool cores. The active core count is the sum of all cores not in a waiting (CC6) state. Average cool cores are a prior value of the remote cooling counter, and in one embodiment is shifted right by the cooling time constant exponent to implement a moving average solution.

Similarly, in one pseudo code in FIG. 3A, a CPU local heating average is derived. A local heating counter is derived according to a previous value of the local heating counter and an active core count reduced by average cool cores. An active core count is the sum of all cores not in a CC6 state. Average hot cores are a prior value of the local heating counter and in one embodiment is shifted right by the heating time constant exponent to implement a moving average solution.

Similarly in another pseudo code in FIG. 3A, a GPU remote cooling moving average is derived. GPU power is first derived according to a previous value of the GPU power and a percentage of power used reduced by average GPU power. Average GPU power is a prior value of the GPU power and in one embodiment is shifted right by the GPU time constant exponent to implement a moving average solution.

A determination for application of the GPU PDM is also made as shown in one example pseudo code shown in FIG. 3B. The GPU PDM is applied when the moving average GPU power is less than the Actual GPU threshold and the values from Table 3 in column B are chosen (depending upon core activity). The GPU PDM is not applied when the moving average GPU power is greater than the actual GPU threshold and the values from Table 3 in column A are chosen (depending upon core activity).

Pseudo code for implementing a moving average function is described in FIG. 3C. The pseudo code in FIG. 3C factors in the number of cores that are active over a moving average whose time duration is controlled by the time duration constants as described in Table 1. The pseudo code determines the value of PDM that should be applied given particular parameters that are variable per part number, for example, 35 W in Table 2 and is a mathematical model for providing a trade off between local heating and associated time constant versus the lateral cooling and associated time constant.

The pseudo code first determines a moving average number of cool cores, checks values with respect to constants as described above, and determines which value of PDM is applied. In an example embodiment, referring to Table 3 (for a number of active cores), the pseudo code picks the minimum between the two moving averages—moving averages for cooling (the lateral cooling effect) and heating (local heating effect) are derived and a minimum value of the two is chosen for application of the PDM.

This simplification changes the time constant and determines an average that asymptotically approaches the true moving average. Other implementations are possible and are not excluded. Those skilled in the art would understand that the pseudo-code provided in FIGS. 3A, 3B, and 3C is one possible implementation and other implementations are also possible.

Figure 4:
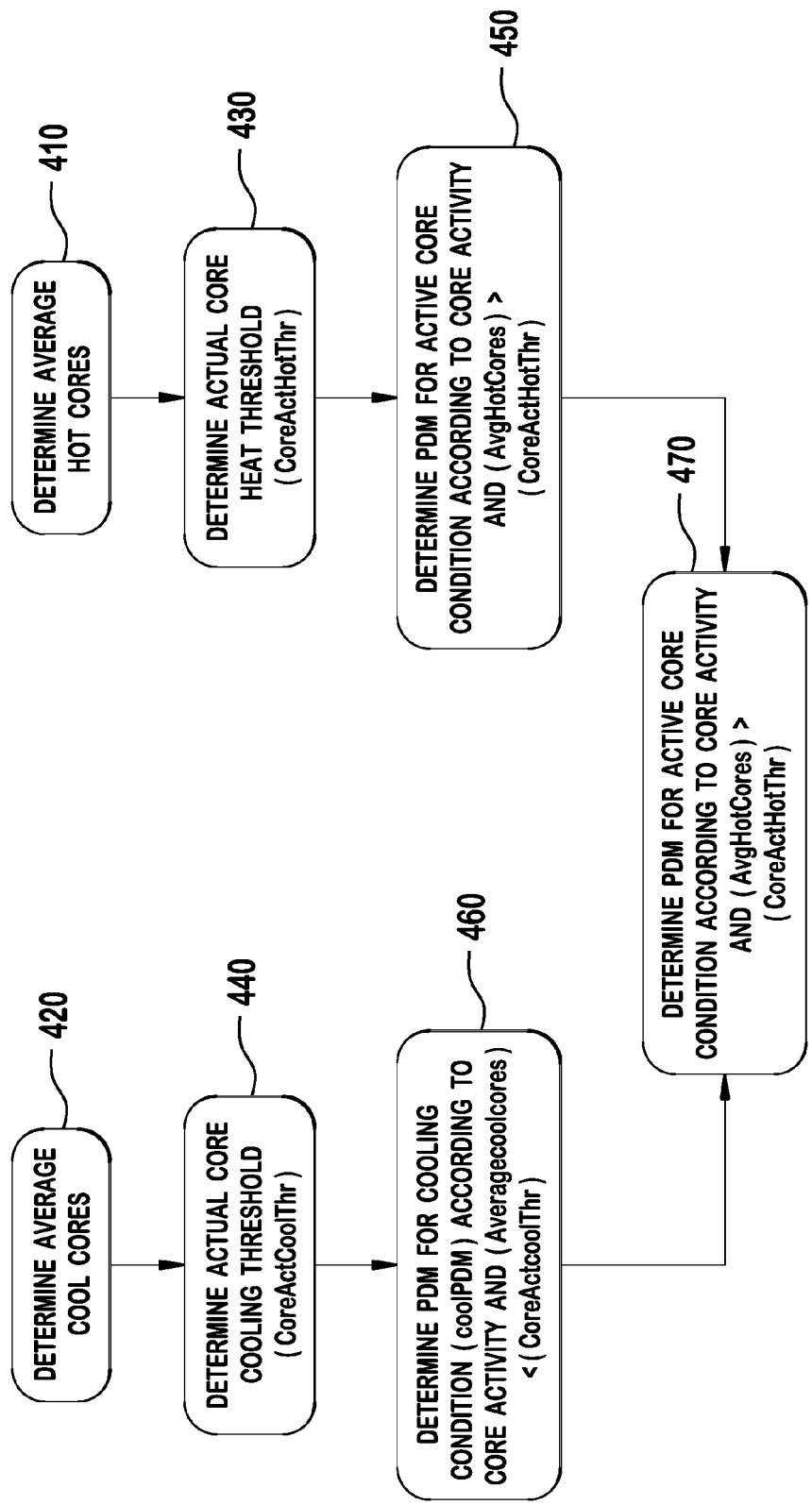
FIG. 4 shows a flow diagram for determining case specific PDM values according to the implementation described in FIG. 3.

FIG. 4 shows a flow diagram for determining case specific PDM values for application according to the algorithm for implementing a moving average function described in FIGS. 3A-3C.

In FIG. 4, the number of cores that are active over a moving average whose time duration is controlled by the time duration constant (Table 1) are determined. This determination includes determination of active cores (hot cores) (step 410) and consequently the number of cores not in an active state (step 420). Depending upon whether a core is active, an activity threshold is also determined (steps 430, 440). Then depending upon the core condition (whether it is in an active state), a PDM value is determined (steps 450, 460) according to the core type including parameters such as device geometry, power rating, etc. Essentially, a moving average number of cool cores is determined initially, checked against values with respect to constants (as described in Tables 1, 2, and 3), and a chosen PDM value is applied (step 470).

Figure 5:
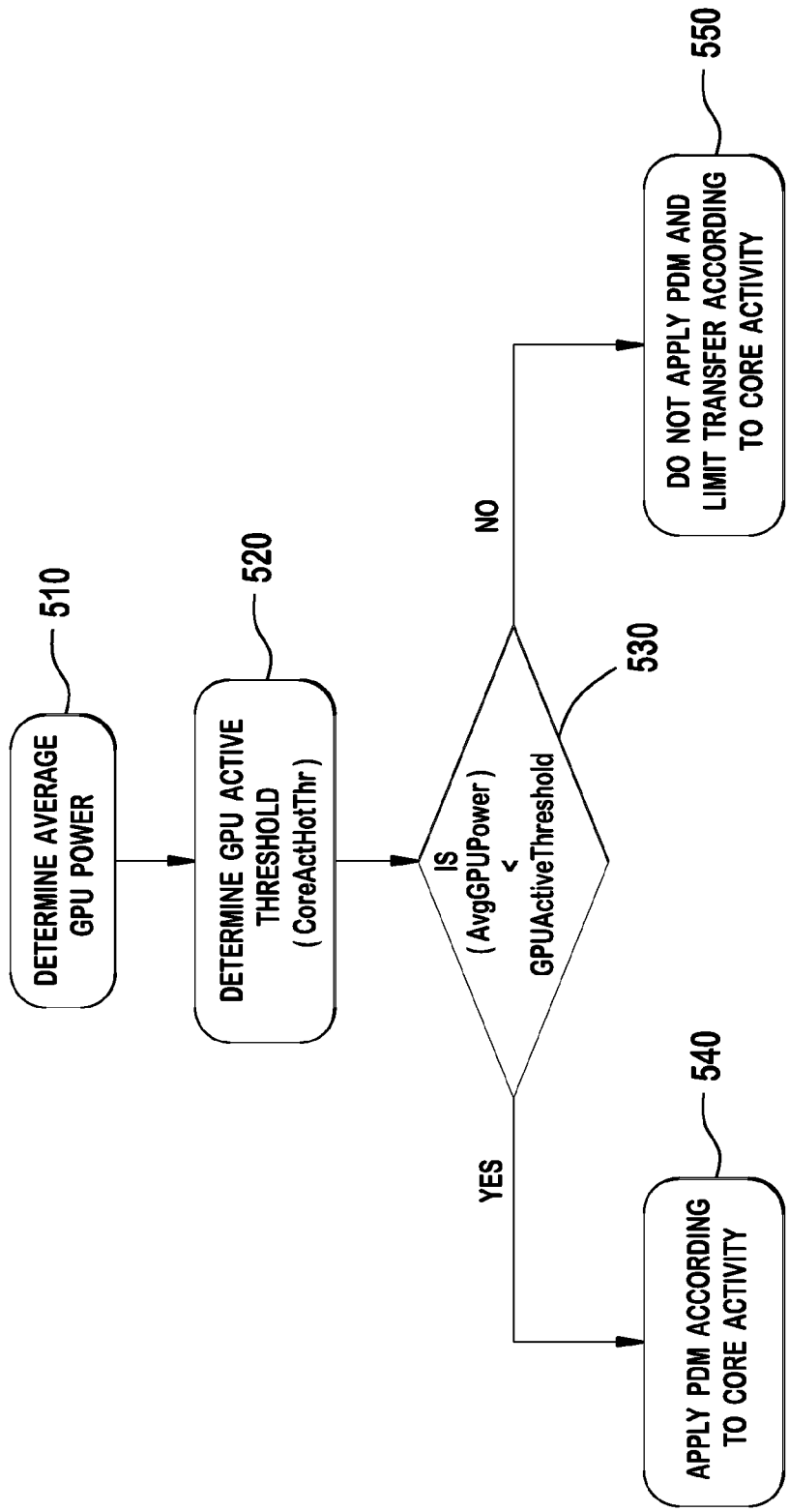
FIG. 5 shows application of PDM values when a GPU is used to provide power to CPUs according to an example embodiment.

FIG. 5 shows a flow diagram for application of PDM value when a GPU is used to provide power to CPUs according to an example embodiment. Initially, average GPU power is determined (step 510) including a GPU remote cooling moving average. The average GPU power is derived from a previous value of the GPU power and a percentage of power used reduced by average GPU power. Hence, an average GPU power is a prior value of the GPU power. Depending upon GPU activity and rating, a GPU threshold is also determined (step 520). A check is performed to determine whether the average GPU power is less than an active GPU threshold (step 530). A GPU PDM is applied (step 540) when the moving average GPU power is less than the Actual GPU threshold and the values from Table 3 in column B are chosen (depending upon core activity). The GPU PDM is not applied (step 550) when the moving average GPU power is greater than the actual GPU threshold and the values from Table 3 in column A are chosen (depending upon core activity). The value of the GPU PDM may be derived from a thermal static test bench and applied according to core activity.

The embodiments described herein optimize power consumed in a multicore situation for performance and utilize a moving average implementation. This allows PDMs to be applied using thermal time constants and allows for improved performance over PDMs when applied immediately without constraints of thermal time constants.

The embodiments described herein may be implemented in a CPU, a GPU, or any combination thereof. Those skilled in the art would appreciate that the GPU may form part of another device, e.g., an integrated north bridge, an application processor (Apps Processor), a central processing unit (CPU), a digital signal processor (DSP), or the like.

Embodiments of the invention may be represented as instructions and data stored on a computer readable memory. For example, aspects of the invention may be included in a hardware description language (HDL) code stored on such computer readable media. Such instructions, when processed may generate other intermediary data (e.g., netlists, GDS data, or the like) that can be used to create mask works that are adapted to configure a manufacturing process (e.g., a semiconductor fabrication facility). Once configured, such a manufacturing process is thereby adapted to manufacture processors or other semiconductor devices that embody aspects of the present invention.

The present invention may be embodied in hardware, software, firmware, or any combination thereof. Embodiments of the present invention or portions thereof may be encoded in many programming languages such as hardware description languages (HDL), assembly language, C language, netlists etc. For example, an HDL, e.g., Verilog, can be used to synthesize, simulate, and manufacture a device, e.g., a processor, application specific integrated circuit (ASIC), and/or other hardware element, that implements the aspects of one or more embodiments of the present invention. Verilog code can be used to model, design, verify, and/or implement a processor capable of applying power density multipliers optimally in a multicore system.

For example, Verilog can be used to generate a register transfer level (RTL) description of logic that can be used to execute instructions so that power density multipliers can be applied optimally in a multicore system. The RTL description of the logic can then be used to generate data, e.g., graphic design system (GDS) or GDS II data, used to manufacture the desired logic or device. The Verilog code, the RTL description, and/or the GDS II data can be stored on a computer readable medium. The instructions executed by the logic to perform aspects of the present invention can be coded in a variety of programming languages, such as C and C++, and compiled into object code that can be executed by the logic or other device.

Aspects of the present invention can be stored, in whole or in part, on a computer readable media. The instructions stored on the computer readable media can adapt a processor to perform the invention, in whole or in part, or be adapted to generate a device, e.g., processor, ASIC, other hardware, that is specifically adapted to perform the invention in whole or in part. These instructions can also be used to ultimately configure a manufacturing process through the generation of maskworks/photomasks to generate a hardware device embodying aspects of the invention described herein.

What is claimed is:

1. A method for increasing performance of thermal entities of a multicore processor by application of a power density multiplier (PDM), comprising:
   the processor selecting a PDM from a plurality of PDM values, wherein the PDM is selected according to parameters of the thermal entities including power rating, number of thermal entities not in active state, and an activity threshold; and
   the processor applying the PDM to a thermal design power budget of a thermal entity for transferring power allocation from thermal entities not in an active state to thermal entities in an active state.

2. The method of claim 1, wherein different thermal entities are in different power or performance states.

3. The method of claim 1, wherein if the thermal entities are of a same type, applying the PDM on a counter based scheme.

4. The method of claim 3, wherein the counters are used in computing a moving average of an activity level in a thermal entity and generating the moving average by using power gating as a binary proxy for the activity level.

5. The method of claim 4, wherein the counters include:
   a first counter for tracking a local heating moving average based on local heating time constants; and
   a second counter for tracking a remote cooling moving average based on remote cooling time constants.

6. The method of claim 1, wherein if the thermal entities are not of a same type, applying the PDM on a threshold based scheme.

7. The method of claim 6, further comprising:
   determining a moving average of a percentage of maximum power for each thermal entity, wherein the percentage of maximum power is based on a dynamic power management state of the thermal entity, the moving average used in applying the PDM.

8. The method of claim 7, wherein a time constant for the moving average is selected so that the moving average approaches a predetermined value.

9. The method of claim 7, wherein the PDM is applied if the moving average of a thermal entity is less than an actual power threshold of the thermal entity.

10. The method of claim 1, wherein an amount of power allocated from an inactive thermal entity to an active thermal entity depends on a power rating of the active thermal entity.

11. The method of claim 1, wherein a thermal entity is part of another device, wherein the other device is any one of: an integrated northbridge, an application processor, a central processing unit, or a digital signal processor, a graphics processing unit, or a field programmable gate array.

12. A device, comprising:
   a microcontroller configured to increase performance of thermal entities in the device by applying a power density multiplier (PDM), the microcontroller configured to:
   select a PDM from a plurality of PDM values, wherein the PDM is selected according to parameters of the thermal entities including power rating, number of thermal entities not in active state, and an activity threshold; and
   apply the PDM to a thermal design power budget of each thermal entity, to transfer power allocation from thermal entities not in an active state to thermal entities in an active state.

13. The device of claim 12, wherein different thermal entities are in different power or performance states.

14. The device of claim 12, wherein the microcontroller is configured to apply the PDM on a counter based scheme if the thermal entities are of a same type.

15. The device of claim 14, wherein the counters are used to compute a moving average of an activity level in a thermal entity and generate the moving average by using power gating as a binary proxy for the activity level.

16. The device of claim 15, wherein the counters include:
   a first counter for tracking a local heating moving average based on local heating time constants; and
   a second counter for tracking a remote cooling moving average based on remote cooling time constants.

17. The device of claim 12, wherein the microcontroller is configured to apply the PDM on a threshold based scheme if the thermal entities are not of a same type.

18. The device of claim 17, wherein the microcontroller is further configured to:
   determine a moving average of a percentage of maximum power for each thermal entity, wherein the percentage of maximum power is based on a dynamic power management state of the thermal entity, the moving average used to apply the PDM.

19. The device of claim 18, wherein a time constant for the moving average is selected so that the moving average approaches a predetermined value.

20. The device of claim 18, wherein the PDM is applied if the moving average of a thermal entity is less than an actual power threshold of the thermal entity.

21. The device of claim 12, wherein an amount of power allocated from an inactive thermal entity to an active thermal entity depends on a power rating of the active thermal entity.

22. The device of claim 12, wherein a thermal entity is part of another device, wherein the other device is any one of: an integrated northbridge, an application processor, a central processing unit, or a digital signal processor, a graphics processing unit, or a field programmable gate array.

23. A non-transitory computer-readable storage medium storing a set of instructions for execution by one or more processors to facilitate manufacture of a device, the device comprising:
- a microcontroller configured to increase performance of thermal entities in the device by applying a power density multiplier (PDM), the microcontroller configured to:
- select the PDM from a plurality of PDM values, wherein the PDM is selected according to parameters of the thermal entities including power rating, number of thermal entities not in active state, and an activity threshold; and
- apply the PDM to a thermal design power budget of each thermal entity, to transfer power allocation from thermal entities not in an active state to thermal entities in an active state.

24. The computer-readable storage medium of claim 23, wherein the instructions are hardware description language (HDL) instructions used for the manufacture of a device.

* * * * *